United States Patent
Nignon (10) Patent No.: US 8,688,264 B2
(45) Date of Patent: Apr. 1, 2014

(54) METHOD OF TREATING OBJECTS ACCORDING TO THEIR INDIVIDUAL WEIGHTS

(75) Inventor: Gilles Nignon, Brec'h (FR)

(73) Assignee: Arbor S.A., Landevant (FR)

( * ) Notice: Subject to any disclaimer, the term of this patent is extended or adjusted under 35 U.S.C. 154(b) by 209 days.

(21) Appl. No.: 13/062,703

(22) PCT Filed: Sep. 16, 2009

(86) PCT No.: PCT/FR2009/051743
§ 371 (c)(1),
(2), (4) Date: Mar. 8, 2011

(87) PCT Pub. No.: WO2010/037942
PCT Pub. Date: Apr. 8, 2010

(65) Prior Publication Data
US 2011/0166696 A1    Jul. 7, 2011

(30) Foreign Application Priority Data

Sep. 30, 2008  (FR) ....................................... 08 56586
Oct. 22, 2008  (FR) ....................................... 08 57180

(51) Int. Cl.
*G06F 7/00* (2006.01)
*G05B 19/04* (2006.01)

(52) U.S. Cl.
USPC ........... 700/223; 700/224; 700/228; 700/231; 700/245; 700/248

(58) Field of Classification Search
None
See application file for complete search history.

(56) References Cited

U.S. PATENT DOCUMENTS

| 3,274,377 | A | * | 9/1966 | Morison | 702/84 |
| 4,884,696 | A | * | 12/1989 | Peleg | 209/545 |
| 6,484,122 | B1 | * | 11/2002 | Maetschke | 702/179 |
| 2005/0137744 | A1 | * | 6/2005 | Winkelmolen et al. | 700/223 |
| 2006/0162970 | A1 |   | 7/2006 | Gudjonsson et al. |  |
| 2007/0219878 | A1 | * | 9/2007 | Gudjonsson et al. | 705/28 |
| 2009/0026119 | A1 |   | 1/2009 | Heigl |  |
| 2009/0216368 | A1 |   | 8/2009 | Thorsson |  |
| 2010/0326893 | A1 | * | 12/2010 | Hueppi et al. | 209/645 |

FOREIGN PATENT DOCUMENTS

JP    2002-365122 A    12/2002

OTHER PUBLICATIONS

K. Khodabandehloo, "Robotic packaging of poultry products,"Robotics in Meat, Fish and Poultry Processing, Sep. 1, 1002.

* cited by examiner

*Primary Examiner* — Yolanda Cumbess
(74) *Attorney, Agent, or Firm* — Leydig, Voit & Mayer, Ltd.

(57) ABSTRACT

A method of distributing objects, having a random distribution of weights, according to their weights. In the method, the presence of one of the objects is detected, the detected object is grasped by a robot, and the object grasped is weighed by a sensor. The weight measured is associated with the object and stored. The process is repeated for the objects. The weight distribution obtained from the weights measured is used in filling containers with objects so that containers are optimally filled.

8 Claims, 5 Drawing Sheets

METHOD OF TREATING OBJECTS ACCORDING TO THEIR INDIVIDUAL WEIGHTS

FIELD OF THE INVENTION

The invention relates to a method of treating objects according to their individual weights. More particularly, the invention relates to a method of filling containers with objects whereof the weight distribution is random.

BACKGROUND

Such methods are known on packaging chains, in particular for packaging food products. Objects such as fish or poultry filets have weights that vary from one individual to the next around an average unique to the space and sometimes the capture season.

Methods exist in which the objects, e.g., sardines, are cut to a length that imposes the weight, which, at a constant morphology of the species, depends greatly on the length.

Methods also exist to make the object pass in an orderly manner on a conveyor provided with a weighing device.

The methods known from the prior art do not make it possible to precisely control the weight.

However, constraints relative to respect of the weight in the packaging are becoming stricter. While it is allowed for the announced weight of the merchandise, hereinafter called the target weight, to be exceeded, it is not allowed for the actual weight to be below the target weight. However, an excessive surplus weight over significant quantities of products has considerable cost repercussions. The target weight can concern the weight of several objects grouped together or the weight of each object considered individually.

One problem posed is that of filling the containers until a minimum weight is accumulated in each container as closely as possible.

More generally, one problem posed is that of treating the objects with maximum precision depending on their individual weights, the distribution of which is random.

SUMMARY OF THE INVENTION

To resolve this problem and others posed by the prior art, the invention relates to a method for distributing objects presented with a random weight distribution, so as to treat the objects as a function of their weight, comprising steps carried out cyclically so as to detect an object, grasp the detected object using a gripper mounted on a robot, measure the weight of the object grasped using a weight or force sensor, and acquire the weight by associating it with the object.

Advantageously, to fill containers each comprising one or several objects until a minimum weight is accumulated in each filled container, the method comprises steps carried out after having acquired the weight associated with the object so as to look in a collection of containers, for an optimal container using a sorting algorithm that uses a statistical distribution law of the weights and deposit the object with the acquired weight in the optimal container estimated by the sorting algorithm.

Particularly, the weight or force sensor is positioned on the gripper between a gripper body and a gripper member or between the gripper body and a fastening member on the robot.

More advantageously, the weight or force sensor is positioned on an anchor member of the robot.

More particularly, the object is detected by a camera.

Still more particularly, the weight is estimated as a function of the viewable dimensions of the object.

Preferably, the weight is stored so as to establish the statistical distribution law of the weight over several execution cycles.

Additionally, dimensions of the object captured from the camera are stored so as to establish, over several execution cycles, a relationship between the weight and the dimensions captured from the camera.

Other advantageous features will also be noted such as those of using a Laplace Gauss law as the statistical distribution law, those of looking for the optimal container so as to maximize the probability calculated using the statistical distribution law to accumulate the minimum weight in the container considered optimal with objects that follow the object whereof the weight is acquired.

One preferred embodiment consists of building the collection of containers, while adding a container entering into an accessibility field of a robot and reducing the collection of containers, by taking out a container outside the accessibility field of the robot.

Particularly, the entering container is an empty container or a container outside the accessibility field of a preceding robot and the exiting container is a full container or a container that is in the field of accessibility of a following robot.

Advantageously, the method uses a first conveyor to make the object enter the accessibility field of the robot, a second conveyor to make the container enter the accessibility field of the robot a first time, and a third conveyor to make the container enter the accessibility field of the robot a second time if the container has left the accessibility field of the robot without having been able to be completely filled.

BRIEF DESCRIPTION OF DRAWING FIGURES

The invention will be better understood upon reading the following description and examining the accompanying figures. These figures are only provided as illustrative and non-limiting examples of the invention. They show.

Identical elements keep the same reference from one figure to the next.

DETAILED DESCRIPTION

Figure 1:
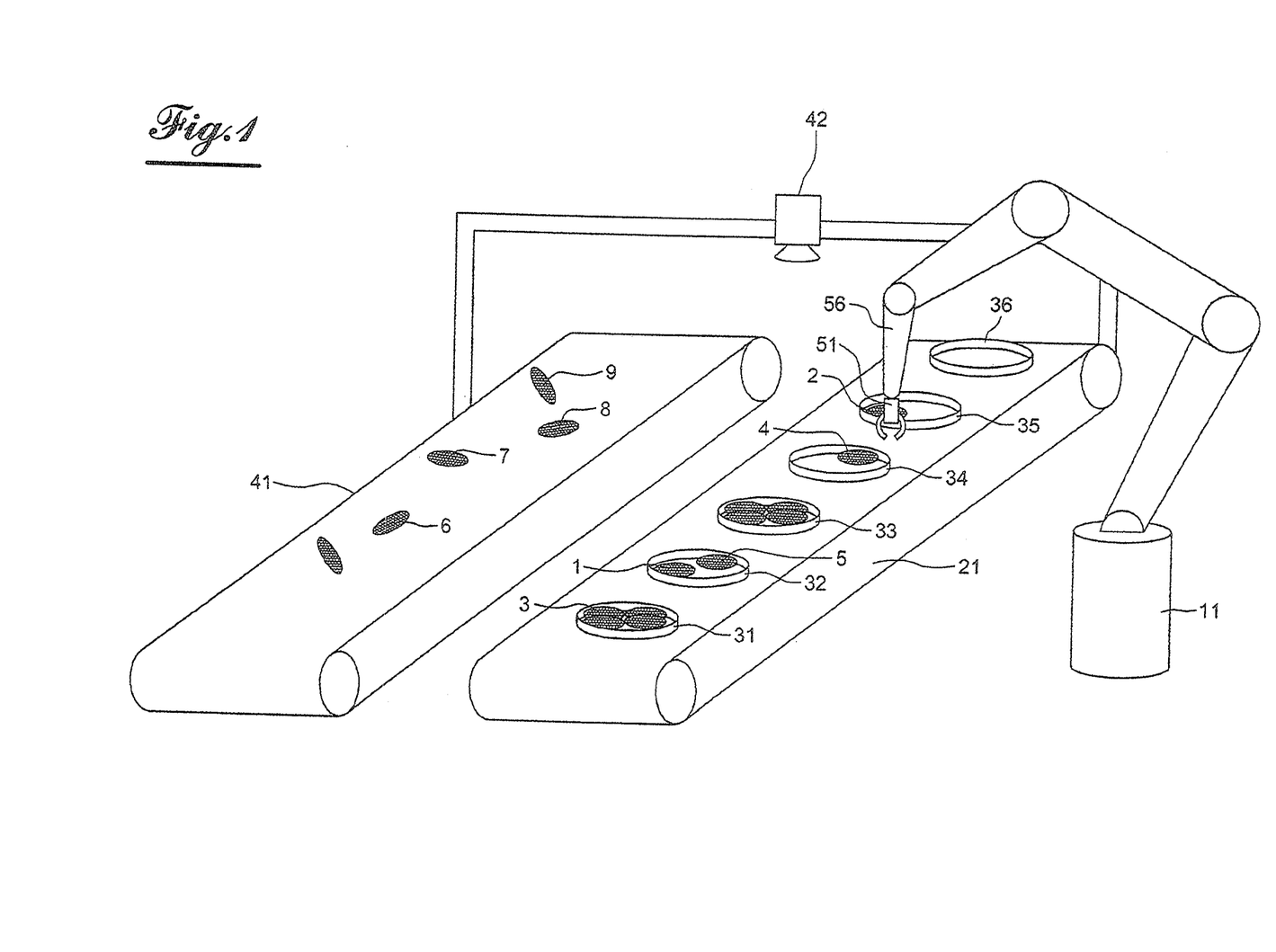
FIG. 1 is a diagrammatic perspective illustration of a first embodiment of a packaging chain for implementing the invention.

In reference to FIG. 1, a packaging chain comprises a conveyor 41 on which sardines 6, 7, 8, 9 are presented in bulk, scattered, which constitute objects having a random weight distribution. Other foodstuffs can constitute such objects, such as filets of mackerel or other fish, poultry filets or livers, or another other product whereof the weight is not necessarily calibrated. The bulk presentation results from prior treatment these objects have undergone: bulk, washing, cutting, cooking, portioning, slicing, sawing, etc.

A conveyor 21 receives containers 36 of foodstuffs that are initially empty and discharges containers 31 that are full. In the example illustrated by FIG. 1, the containers are sardine boxes. For fruits, the containers could be bags.

A robot 11 provided with a gripper 51 mounted at the end of a hinged arm 56 distributes sardines 1, 2, 3, 4, 5 in the boxes 31, 32, 33, 34, 35 until a minimum weight is accumulated in each box that the robot fills by taking the sardines one by one on the conveyor 41.

When the objects to be grasped are completely aligned in the direction of movement of the conveyor, a simple photoelectric cell is enough to detect them and allow the robot 11 to identify them by taking the movement of the conveyor into account as is common practice in automatic monitoring processes.

When the objects to be grasped are not aligned and oriented in every direction as is the case for the sardines 6 to 9, a camera 42 placed above the conveyors 21, 41 and oriented towards the inlet of the conveyors, facilitates the detection of the objects and their identification by the robot 11. Secondarily, the camera 42 also enables the robot to identify the boxes.

The robot 11 of FIG. 1 is positioned next to the conveyor 21. In reference to FIGS. 2A and 2B, the robot 11 is suspended above the conveyors 21, 41 and an additional conveyor 22. The conveyor 22 is arranged to make a container that could not be filled after a first passage, pass under the robot 11 again. In the example illustrated here, the containers are tubs and the objects are any bare products before packaging in the tubs. The objects before packaging can also be film-covered products, i.e., individually covered with a protective film. The robot 11 of FIG. 2A comprises one or several arms 56 articulated to maintain and move a gripper 65 after having grasped an object from the conveyor 41 towards the conveyor 21 or towards the conveyor 22 and from the conveyor 21 or the conveyor 22 or towards the conveyor 41 after having deposited the object in a container. According to a first alternative embodiment, the gripper 65 is identical to the gripper 51 of FIG. 1.

Figure 3:
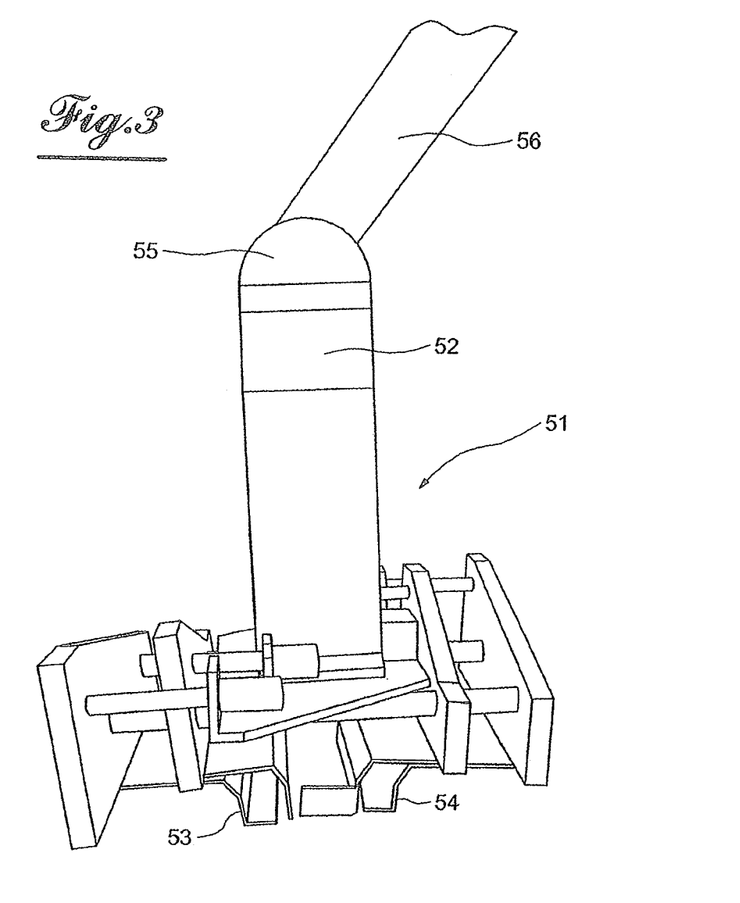
FIG. 3 is a perspective view of a gripper mounted on a robot head to implement the invention.

In reference to FIG. 3, the gripper 51 is connected to the arm 56 by a handle 55. Claws 53, 54 are arranged to grasp an object on the conveyor 41 and release the object in a container on the conveyor 21 or the conveyor 22. The gripper 51 comprises a weight or force sensor 52 positioned between the handle 55 and the claws 53, 54 to weigh each object grasped on the conveyor 41. In industrial processes, the robot arms act at high speeds, often with a deceleration phase that directly follows the acceleration phase. It is preferable to stop briefly or at least to have a stabilized speed of the arm for a short moment when a weight sensor is used. Taking into account knowledge of the acceleration resulting from the feedback loop of the robot arm, the use of a force sensor makes it possible to measure in midair by offsetting the dynamic stresses by software. The force sensor is for example a strain gauge applied on the surface of a member of the gripper. In the example illustrated by FIG. 3, the force sensor 52 is situated between the body of the gripper and a fastening member of the gripper on the handle 55 of the robot. Alternatively, the force sensor can be placed between the gripper body and a gripper member formed here by the claws 53, 54. Claws that grasp the object by the bottom are preferable for fragile objects, such as cooked fish filets. For solid objects that do not risk coming apart, a suction gripping member such as a suction cup can be suitable, and an electromagnetic system could be suitable for objects containing iron.

After filling, each container must contain a minimum weight of objects. This minimum weight constitutes a target weight that is only authorized to be exceeded.

Figure 4:
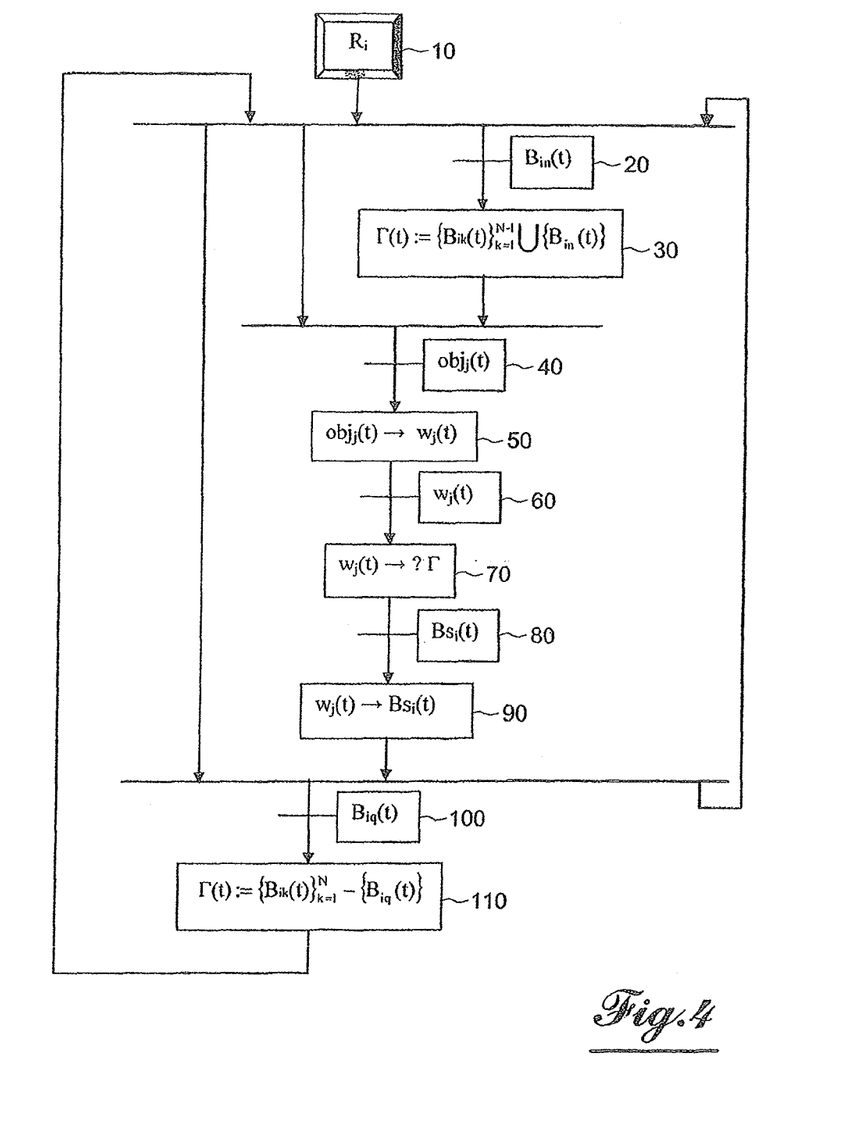
FIG. 4 shows steps of a method according to the invention.

The robot 11, considered a robot $R_i$ with index i among other robots, is controlled by a programmable machine or a computer (not shown) arranged to carry out the steps of the method now described in reference to FIG. 4.

In an execution cycle at a moment t, a transition 40 is validated from a preceding step, in particular an initial step 10, when an object is detected. The object can be detected simply by a photoelectric cell positioned on the conveyor 41. The object is preferably detected by the camera 42, which then simultaneously captures the shape and arrangement of the object on the conveyor. Each object detection is indexed by an index j, which references an object $obj_j$ in a first stored associative table of the computer. This first associative table is structured to contain attributes of the detected object $obj_j$. These attributes comprise, in particular, the evolution of the position of the object relative to the robot during the advancement of the conveyor 40. These attributes secondarily comprise the orientation and viewable dimensions of the object captured by the camera 42.

A validation of the transition 40 activates a step 50 to acquire the weight of the object and in which a specific attribute is reserved in the first associative table to associate the weight $w_j$ with the object $obj_j$ with a same index j. The weight is for example acquired using the weight sensor 52 when the robot grasps the object. Also for example, the weight $w_j$ is estimated as a function of the viewable dimensions of the object $obj_j$. To estimate the weight of the objects, calculation charts can be used that, for a given type of fish for example, match a weight to a volume for different periods of the year during which the fish is caught. It is also possible to use a learning mechanism that consists of storing a relationship between weight measured by the sensor 52 and the volume or surface of the object measured from the camera 42 and to continuously correct the estimated weight with the measured weight so as to anticipate the value of the weight before the robot grasps the object.

In step 50, the weight $w_j$ is preferably stored so as to establish a statistical distribution law of the weights over several execution cycles of the method. Knowledge of the statistical distribution law then makes it possible to calculate the probability of having a future object in a given weight range, the utility of which will appear in the continuation of the description. The random weights of the objects follow a distribution law that can be established using traditional methods of the statistical sciences. One method that makes it possible to save computation and storage resources, is to consider that the statistical distribution law is a Laplace Gauss law given by the formula:

$$f(w_j(t) = x) = \frac{1}{\sigma\sqrt{2\pi}} e^{-\frac{1}{2}(\frac{x-\mu}{\sigma})^2}$$

It is then sufficient to calculate the empirical average $\mu$ and the empirical standard deviation a in real time each time a new object is grasped using the formulas:

$$j := j+1$$
$$\mu := \frac{(j-1)\cdot\mu + w_j}{j}$$
$$\sigma := \sqrt{\frac{(j-1)\cdot\sigma^2 + (w_j - \mu)^2}{j}}$$

If the statistical distribution law is not known a priori, a corrected empirical standard deviation formula can be used:

$$\sigma := \sqrt{\sigma^2 + \frac{(w_j - \mu)^2}{j-1}}$$

A transition 60 is validated by the knowledge of the weight $w_j$. To validate the transition 60, the weight can be acquired through a prior execution of step 50. If the packaging chain comprises product monitoring upstream, which makes it possible to communicate the weight of each detected object, step 50 is not necessary to acquire the weight.

A validation of the transition 60 activates a step 70 that consists of looking for an optimal container in a collection Γ of containers, using a sorting algorithm that uses a statistical distribution law. The collection Γ comprises the containers that are accessible to the robot at a given moment t. These are, for example, the containers 32 to 35 on the conveyor 21 of FIG. 1 or the containers that are on the conveyors 21 and 22 of FIG. 2 and under the robot 11. The statistical distribution law is the law determined in step 50 or a law determined a priori in another way, e.g., resulting from an upstream treatment or the provision of the basic products. A Laplace Gauss law yields good results. There are a number of sorting algorithms that can be implemented to carry out step 70. Non-limitingly, this includes neuron arrays, support vector machines (SVM), or Bayesian methods.

An example of a particular sorting algorithm that uses a statistical distribution law will now be given in reference to FIG. 5.

An activation of step 70 launches the execution of a loop that examines the containers one by one, starting from a step 700 where a container index k of the collection Γ is initialized at 1 to start with a first container.

Figure 5:
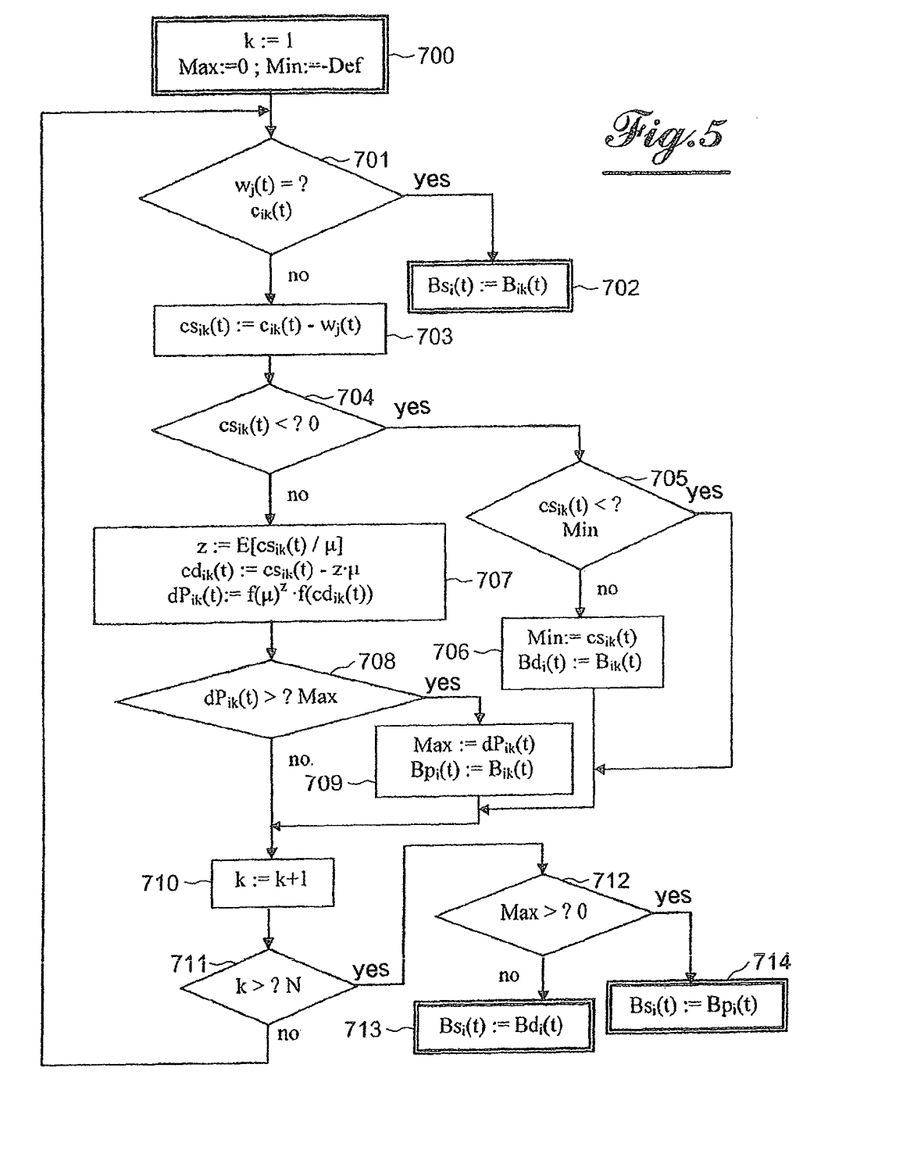
FIG. 5 shows additional steps of one possible embodiment according to the invention.

Steps 702, 713 and 714 make it possible to exit the loop shown in FIG. 5 by returning towards step 70 with a container $Bs_i$ selected in the collection Γ that is considered to be optimal to add the weight $w_j$ thereto so as to obtain a weight accumulation at the end of filling that reaches the target set.

Step 702 is activated once the weight $w_j$ considered in step 70 is equal to a weight supplement $c_{ik}$ needed to reach the target weight in the container $B_{ik}$. To take into account a certain degree of uncertainty on the values given by the measuring apparatuses, a tolerance range is considered on the weight that takes into account the precision of the measurements and what is acceptable on the filling of the containers. No weight value below the target weight being tolerated, the tolerance range yields values higher than the target weight.

It will be noted that the implementation presented from step 702 essentially constitutes an illustrative example of choices taken from several choices of possible priorities to be established by the operator of the method.

Choice no. 1 is to leave the smallest possible amount of products to put in, the containers, go to the end of the intake conveyor of the products while staying within a consequently predefined target weight tolerance.

Choice no. 2 is to impose a minimum number of products to put in the containers while staying within a consequently predefined target weight tolerance.

Choice no. 3 is to target a target weight comprised between a minimum and a maximum without taking into account an imposed number of products.

Choice no. 4 is to target a target weight comprised between a minimum and a maximum while taking into account an imposed number of products.

The activation of step 702 is controlled by a step 701 that continues the progression of the loop as long as the weight $w_j$ is not suitable to reach the target weight by itself in a container with index k of collection Γ. So as to examine the following containers of collection Γ, the index k is incremented in a step 710 to reiterate the loop as long as the index k, checked by a step 711, does not exceed a number N of containers in the collection Γ.

One of steps 713 and 714 is activated after examination of all of the containers without having found a container $B_{ik}$ for which it is possible to achieve the target weight by simply adding the weight $w_j$ in the container. In other words, one of steps 713 and 714 is activated in the absence of positive response to the test of step 701, which relates to the equality between weight $w_j$ and weight supplement $c_{ik}$.

A negative response to the test of step 701 activates a step 703, which calculates a weight supplement along $cs_{ik}$ that would be necessary to reach the target weight if the weight $w_j$ was added to the weight of the container $B_{ik}$. The following weight supplement $cs_{ik}$ is then equal to the current weight supplement $c_{ik}$ from which the current weight $w_j$ is removed.

A step 704 tests whether the following weight supplement $cs_{ik}$ is negative.

A negative value of the following weight supplement $cs_{ik}$ indicates that the target weight is exceeded if the weight $w_j$ was added to the weight of the container $B_{ik}$. The container $B_{ik}$ is then classified among the containers by default to add the weight $w_j$ to it by agreeing to exceed the target weight. The class of default containers is treated in steps 705 and 706, the purpose of which is to determine the least bad container by default.

A positive value of the following weight supplement $cs_{ik}$ indicates that the target weight, to be reached, still requires adding at least one following weight $w_{j+1}$ to the container $B_{ik}$. The container $B_{ik}$ is then classified among the potential containers to add the weight $w_j$ thereto by agreeing to complete the container $B_{ik}$ later to reach the target weight. The class of potential containers is treated in steps 707 to 709, the purpose of which is to determine the best potential container with the aim of filling the containers of the collection, each with the target weight by adding the following weights thereto and the value of which is not known a priori.

More precisely in steps 707 to 709, the optimal container is sought so as to maximize a probability calculated using the statistical distribution law.

A probability density $dP_{ik}$ calculated in step 707 is representative of the probability of accumulating the minimum weight corresponding to the target weight in the container $B_{ik}$ with objects that follow the object whereof the weight $w_j$ is acquired. In the case where the weights $w_j$ follow a Gauss Laplace distribution law, the weights centered on the average μ are the most probable. The maximum number z of times that the average weight μ can appear before filling in the weight supplement along $cs_{ik}$ is equal to the whole part of the ratio $cs_{ik}/\mu$. The last weight supplement $cd_{ik}$ that remains after having added z times the average weight is obtained by subtracting z times the average weight μ of the following weight supplement $cs_{ik}$. It is reasonable to consider that the events each related to the presentation of a weight $w_{j+1}$, $w_{j+2}$, $w_{j+3}$, ..., are independent. The probability of filling in the following weight supplement $cs_{ik}$ after adding the weight $w_j$ is equal to the product of the probabilities of each of the events.

In step 708, the container $B_{ik}$ is considered optimal if the probability density $dP_{ik}$ calculated in step 707 is greater than a Max value that is initialized at zero in step 700.

A positive response to the test of step 708 activates a step 709 in which the probability density $dP_{ik}$ is taken as new Max value. The best potential container $Bp_i$ is then the examined container $B_{ik}$.

A negative response to the test of step 708 directly activates step 710 without modifying the Max value and without defining a best potential container $Bp_i$, which then remains at its preceding value if it exists.

In step 705, the container $B_{ik}$ is considered acceptable by default if the following weight supplement $cs_{ik}$ after adding the weight $w_j$ calculated in step 703 is not below a negative Min value that is initialized at a value-Def in step 700. In other words, the container $B_{ik}$ is considered acceptable by default if the excess relative to the target weight is below the Min value in absolute values.

A negative response to the test of step 705 activates a step 706 in which the following weight supplement $cs_{ik}$ is taken as new Min value. The Min value that is negative then gradually rises towards zero so as to be as low as possible in absolute value. The least bad container by default Bch is then the examined container $B_{ik}$.

A positive response to the test of step 705 directly activates step 710 without modifying the Min value and without defining a new container by default $Bd_i$, which then stays at its preceding value if it exists.

After having examined the N containers $B_{ik}$ of the collection Γ, a positive response to the test of step 711 activates a step 712 that tests whether the Max value is strictly positive. If the Max value is null, it is at its value initialized in step 700, thereby signifying that no potential container $Bp_i$ can be defined. If the Max value is strictly positive, it has been increased in step 709, signifying that a potential container $Bp_I$ considered optimal has been defined in step 709.

A positive response to the test of step 712 activates step 714, which selects container $Bp_i$ as the container $Bs_i$ considered optimal in the collection Γ.

A negative response to the test of step 712 activates step 713, which selects container $Bd_i$ as the container $Bs_i$ considered optimal in the collection Γ.

In reference to FIG. 4, the knowledge of the container $Bs_i$ considered optimal given by the sorting algorithm, validates a transition 80 that activates a step 90 during which the robot deposits the object with weight $w_j$ in the optimal container $Bs_i$ considered optimal to continue to fill the containers with the following objects.

Figure 2A:
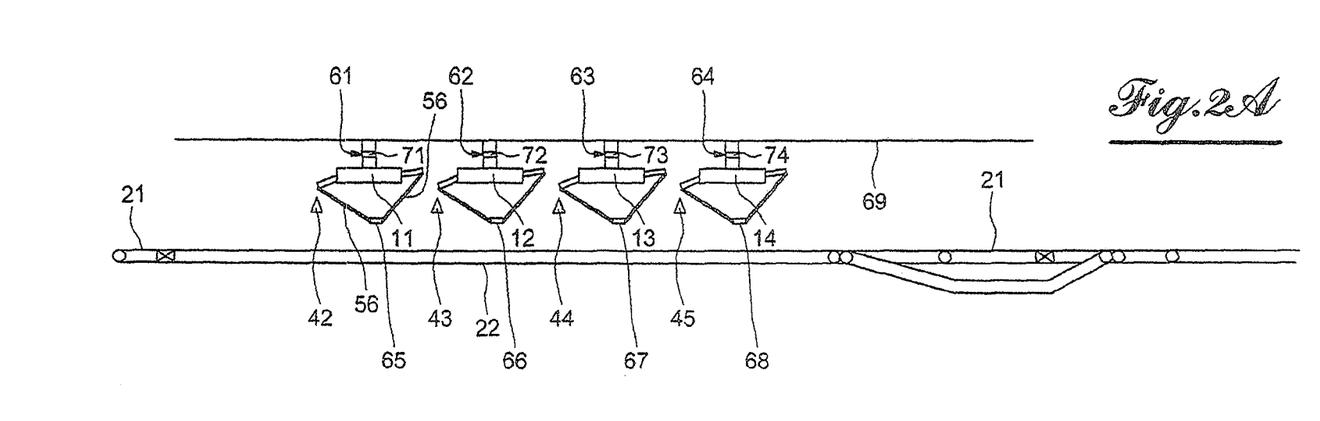
FIGS. 2A and 2B are side and top views of a second embodiment of a packaging chain for implementing the invention.
Figure 2B:
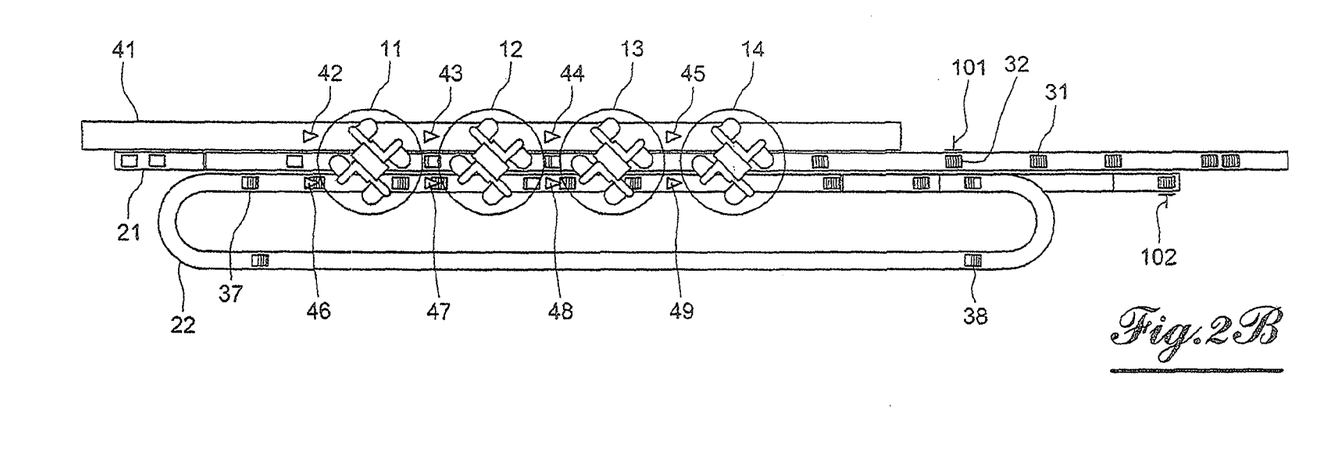

In reference to FIGS. 2A and 2B, the robot 11 is followed by three robots 12, 13, 14. The robots 11 to 14 are programmed so that the last robot takes all of the objects that enter its accessibility field. The camera 42 above the conveyor 41, upstream of the robot 11, can suffice for robots 12, 13, 14 to carry out the method according to the invention, combined with product monitoring that makes it possible to identify the objects under each robot. The efficiency is increased by placing a camera 46 above the conveyors 21 and 22 to ensure monitoring of the containers. The efficiency is further increased by placing, above the conveyor 41, a camera 43, 44, 45 upstream of the robot 12, 13, 14, respectively, and above the conveyor 22, a camera 47, 48, 49 upstream of the robot 12, 13, 14, respectively.

The conveyor 41 is used to make the objects enter the accessibility field of the robot 11 considered robot $R_1$ by the method, then to successively make the objects not grasped by the preceding robot 11, 12, 13, respectively, enter the accessibility field of robot 12, 13, 14 considered robot $R_2$, $R_3$, $R_4$, respectively, by the method.

The conveyor 21 is used to make each container enter the accessibility field of the robot 11, then robot 12, and lastly robot 13 for a first time.

During the filling, the method gives the computer supervising the packaging chain, knowledge of the weight of each container whereof the position is monitored traditionally according to the advancement of the conveyor 21.

The conveyor 22 is used to make the containers that left the accessibility field of the robot 14 without having been able to be filled, enter the accessibility field of the robots 11 to 14 a second time.

An ejector 101 is placed downstream of the robot 14 so as to make each container 32 that passes in front of the ejector 101 without having reached the target weight slide from the conveyor 21 towards the conveyor 22.

An ejector 102 is placed downstream of the robot 14 so as to make the containers that pass in front of the ejector 102 after two passages under each of the robots 11 to 14 slide from the conveyor 22 towards the conveyor 21.

In this way, the containers that are filled by accumulating at least the target weight are ejected from the packaging chain.

The containers $B_{1n}$ that enter the accessibility field of the robot 11 on the conveyor 21 are empty containers and on the conveyor 22 are containers $B_{4q}$ that leave the accessibility field of the robot 14 on the conveyor 21. The containers $B_{2n}$, $B_{3n}$, $B_{4n}$ that respectively enter the accessibility field of the robots 12, 13, 14 on the conveyors 21 and 22 are empty containers $B_{1q}$, $B_{2q}$, $B_{3q}$, partially filled or full, that leave the accessibility field of robots 11, 12, 13, respectively.

The entering containers $B_{in}$, i being equal to 1 in FIG. 1 and i going from 1 to 4 in FIG. 2, validate a transition 20 in the method illustrated in FIG. 4 for each robot $R_i$ that represents one of the robots 11 to 14. The outgoing containers $B_{iq}$ validate a transition 100.

A validation of the transition 20 activates a step 30 during which the container(s) $B_{in}$ entering the accessibility field of the robot $R_i$ are added into the collection of containers Γ, so as to build the collection over the course of the arrival of the entering containers.

A validation of the transition 100 activates a step 110 during which the container(s) $B_{iq}$ exiting the accessibility field of the robot $R_i$ are removed from the collection of containers Γ, so as to reduce the collection as the exiting containers leave.

It will be noted that the introduction of the containers into the accessibility field of a robot is not controlled as a function of a number of objects to be put in the containers, the number of objects varying to reach the target weight. The introduction of the containers is free and simply detected to determine the collection Γ of available containers. Of course the empty containers will be introduced with a reasonable rate to make it possible to evacuate the objects without untimely accumulation.

It will also be noted that different operating directions are possible for the conveyors without going beyond the scope of the present invention.

In FIG. 2B, the cameras 46, 47, 48, 49 are positioned with their camera coverages oriented to the left towards the upstream to anticipate the arrival of the containers. The position of the cameras 46 to 49 is then suitable for circulation of the conveyor 22 under the robots from left to right. The arrangement of the ejectors 101 and 102 on the right part of FIG. 2B with an action downstream of the robot 14 on the conveyor 21, is suitable for circulation of the conveyor 21 under the robots from left to right. Above the conveyor 41, the cameras 42, 43, 44, 45 are positioned with their camera coverages oriented at the left towards the upstream to anticipate the arrival of the objects. The position of the cameras 42 to 45 is then appropriate for circulation of the conveyor 41 under the robots from left to right. In the example illustrated in FIGS. 2A and 2B, the direction of circulation is identical for all three conveyors 41, 21 and 22.

It will be noted that in the example illustrated in FIGS. 2A and 2B, the objects circulating on the conveyor 41 can be made to circulate, in the opposite direction of the containers circulating on the conveyors 21 and 22, by orienting the coverages of the cameras 42, 43, 44, 45 towards the right of the other side of the robots 14, 13, 12, 11, thereby defining the upstream on the conveyor 41, to the right of each robot. The two conveyors 21 and 22 circulating in the same direction as before, the position of the ejectors 101 and 102 remains unchanged.

It will also be noted than an orientation in the opposite direction of the two series of cameras 42 to 45 and 46 to 49 makes it possible to make the conveyor 21 circulate in the same direction as the conveyor 22 by detecting the containers from the conveyor 21 using the series of cameras 46 to 49 and to make the conveyor 21 circulate in the opposite direction of the conveyor 22 by detecting the containers of the conveyor 21 using the series of cameras 42 to 45. The ejectors 101 and 102 will then be arranged accordingly, i.e., the ejector 101 downstream of the conveyor 21 and the ejector 102 downstream of the conveyor 22.

A modification of the circulation direction of the conveyors has no major impact on the programming of the method. The preceding explanations remain valid as long as the two conveyors 21 and 22 circulate in the same direction, whether this direction is identical to that of the conveyor 41 or in the opposite direction. At the very most the parameterization of the method changes when the two conveyors 21 and 22 circulate in opposite directions. In the latter case, the monitoring of the containers entering and leaving for the construction and reduction of the collection Γ of each robot is adapted to take into account that a following robot on one conveyor is a preceding robot on the other conveyor.

According to another particularly interesting alternative embodiment, the robots 11, 12, 13, 14 of FIG. 2A are each respectively equipped with a gripper 65, 66, 67, 68, different from the gripper shown in FIG. 3 in that it does not comprise a weight or force sensor. This makes it possible to lighten the gripper, particularly in terms of electrical connector technology, and thus to facilitate a speed increase of the gripper to accelerate the rhythms. This also prevents premature wear of the connector technology connecting the sensor to the computer going through the arm(s) 56 of the robot that are subject to frequent and rapid movement stresses.

The weight or force sensor being a strong element useful to individually acquire the weight of each object lifted by the robot at the time of its grasping by the gripper, it is possible to position a weight or force sensor at a suitable location of the robot, upstream of the arms in motion, in other words beyond the end of the arm(s), opposite the gripper.

The robots 11, 12, 13, 14 shown in FIG. 2A are each respectively suspended by an anchor member 61, 62, 63, 64 to a ceiling or beam 69 that overhangs the conveyor 21.

A weight or force sensor 71, 72, 73, 74 is respectively positioned on the anchor member 61, 62, 63, 64. Several possibilities exist to take into account the weight of the robot that is added to that of the object that, in particular when it involves a sardine filet, is considerably lighter than the weight of the robot.

For example, among the existing sensors, sensors will be selected whereof the measuring range bears the weight of the robot with a sufficient sensitivity to precisely measure the weight of the object that then constitutes a variation of the total measured weight comprising the weight of the robot, to which the weight of the object is added. Taring can then be done digitally in the computer that controls the robot. Digital taring is interesting in the presence of any controllable variations of the weight of the robot. It suffices to take a measurement by making the gripper operate without taking the object, for example at start-up or periodically at regular intervals.

Also for example, a sensor is selected of the strain gauge type that is adhered on the anchor member after having mounted the robot so that the weight of the robot, empty, exerts a null strain on the gauge.

During grasping of an object, a short stop of the arm(s) can be provided so as to take a measurement at a null speed without being disrupted by the inertia forces.

The invention claimed is:

1. A method for distributing objects having a random weight distribution, the method comprising:
   cyclically
      detecting presence of one of a plurality of objects,
      grasping the object detected with a gripper mounted on a robot,
      measuring, with a sensor mounted on the robot, weight of the object grasped,
      associating the weight that has been measured with the object grasped, and
      repeating the detecting, grasping, measuring, and associating steps for other objects of the plurality of objects;
   filling containers with objects of the plurality of objects that have been weighed until a minimum weight is accumulated in each container, wherein filling the containers comprises
      searching in a collection of containers for an optimal container in which to deposit one of the objects using a sorting algorithm employing a statistical distribution of the weights of the objects,
      depositing one of the objects with an associated weight in the optimal container identified using the sorting algorithm,
      increasing the collection of containers by adding a container within an accessibility field of the robot, and
      reducing the collection of containers by removing a container from the accessibility field of the robot; and
   conveying one of the objects on a first conveyor into the accessibility field of the robot;
   conveying one of the containers on a second conveyor into the accessibility field of the robot a first time; and
   conveying the container on a third conveyor into the accessibility field of the robot a second time if the container has left the accessibility field of the robot without having been completely filled.

2. A method of filling containers with objects selected from a plurality of objects having a random distribution of weights until a minimum weight is accumulated in each container, the method comprising, cyclically:
   conveying some of the plurality of objects on a first conveyor in a first direction;
   conveying one of the objects on the first conveyor into an accessibility field of a robot, and detecting the presence of the object in the accessibility field on the first conveyor;
   grasping the object detected with a gripper mounted on the robot;
   measuring, with a sensor mounted on the robot, weight of the object grasped;

associating the weight that has been measured with the object grasped:

repeating the detecting, grasping, measuring, and associating steps for other objects of the plurality of objects on the first conveyor and conveyed into the accessibility field of the robot;

conveying a plurality of containers on a second conveyor, next to the first conveyor, in the first direction;

conveying some of the plurality containers on the second conveyor into the accessibility field of the robot a first time;

searching amongst the containers on the second conveyor and in the accessibility field of the robot for an optimal container in which to deposit one of the objects, using a sorting algorithm employing a statistical distribution of the weights of the objects, wherein the optimal container maximizes probability, calculated using the statistical distribution, of accumulating the minimum weight in the container with the objects that are subsequently placed in the container identified;

depositing one of the objects with an associated weight in the optimal container identified using the sorting algorithm; and diverting to a third conveyor, adjacent the second conveyor, a container that has left the accessibility field of the robot on the second conveyor without having been completely filled, conveying the container diverted to the third conveyor, on the third conveyor in a second direction, opposite the first direction, and back into the accessibility field of the robot on the second conveyor a second time for adding at least one object to the container.

3. The method according to claim 2, wherein the sensor is positioned on the gripper, between a gripper body and a gripping member of the gripper, or between the gripper body and a fastening member on the robot.

4. The method according to claim 2, wherein the sensor is positioned on an anchor member of the robot.

5. The method according to claim 2, including detecting the presence of the one of the plurality of objects by viewing with a camera.

6. The method according to claim 5, including estimating the weight of the object based on dimensions of the object viewed by the camera.

7. The method according to claim 2, including storing the weights of the objects that are measured and establishing the statistical distribution from the weights that are measured and stored.

8. The method according to claim 5, including storing the weights of the objects that are measured, storing dimensions of the objects that are captured by the camera, and establishing a relationship between weight and dimensions from the weights and dimensions that are measured, captured, and stored.

* * * * *